METHOD AND APPARATUS FOR POSITIONING SHRIMP

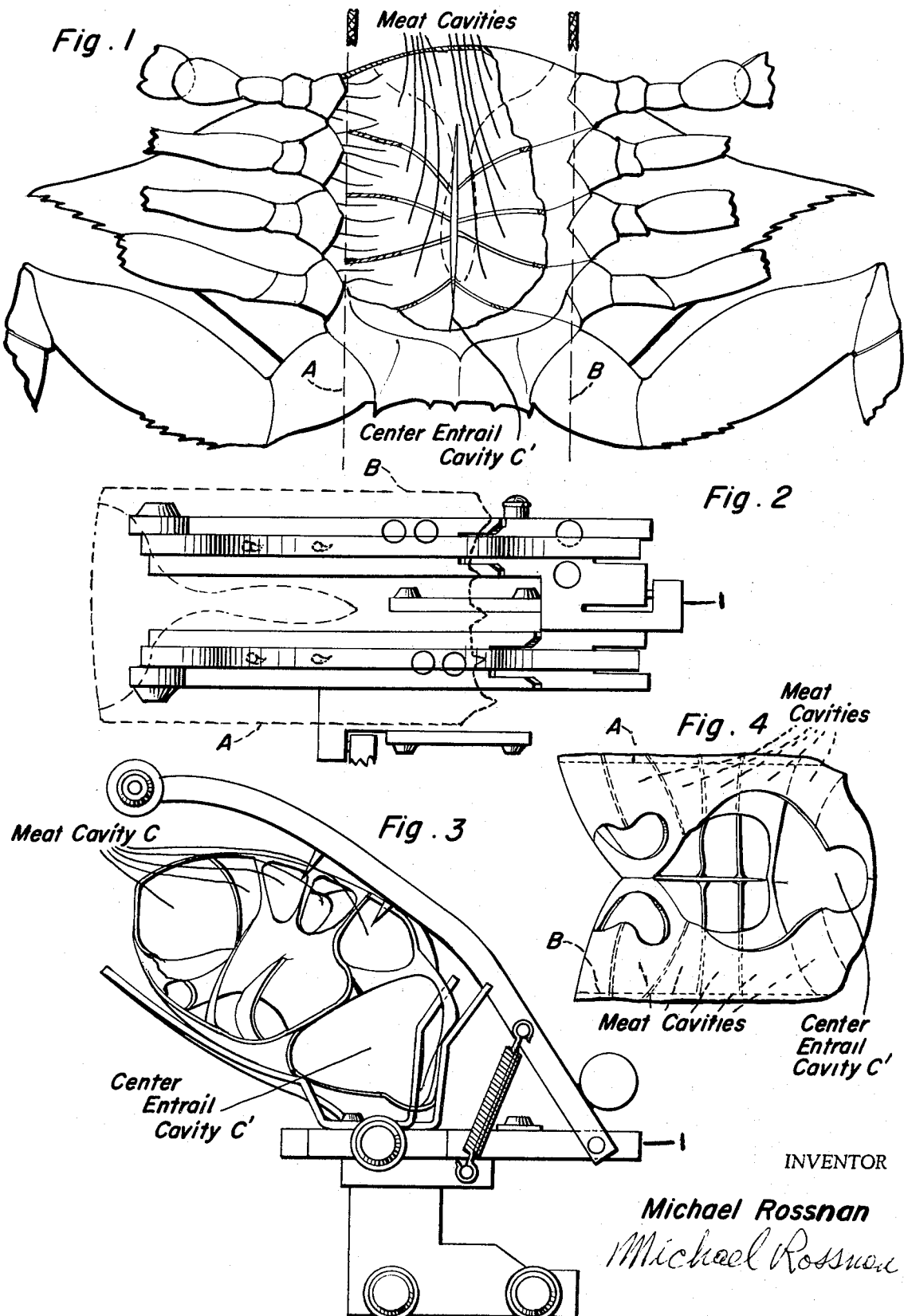

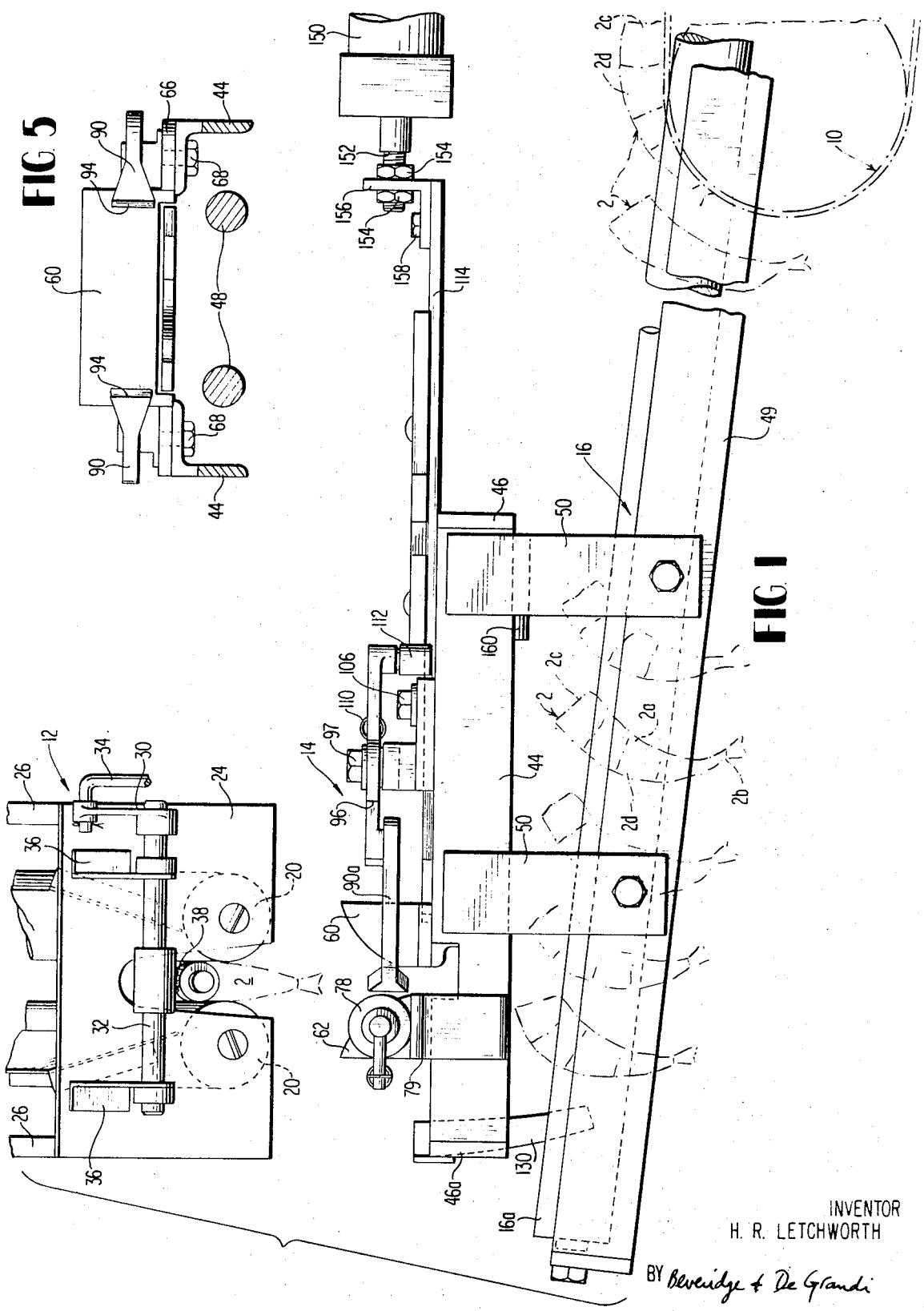

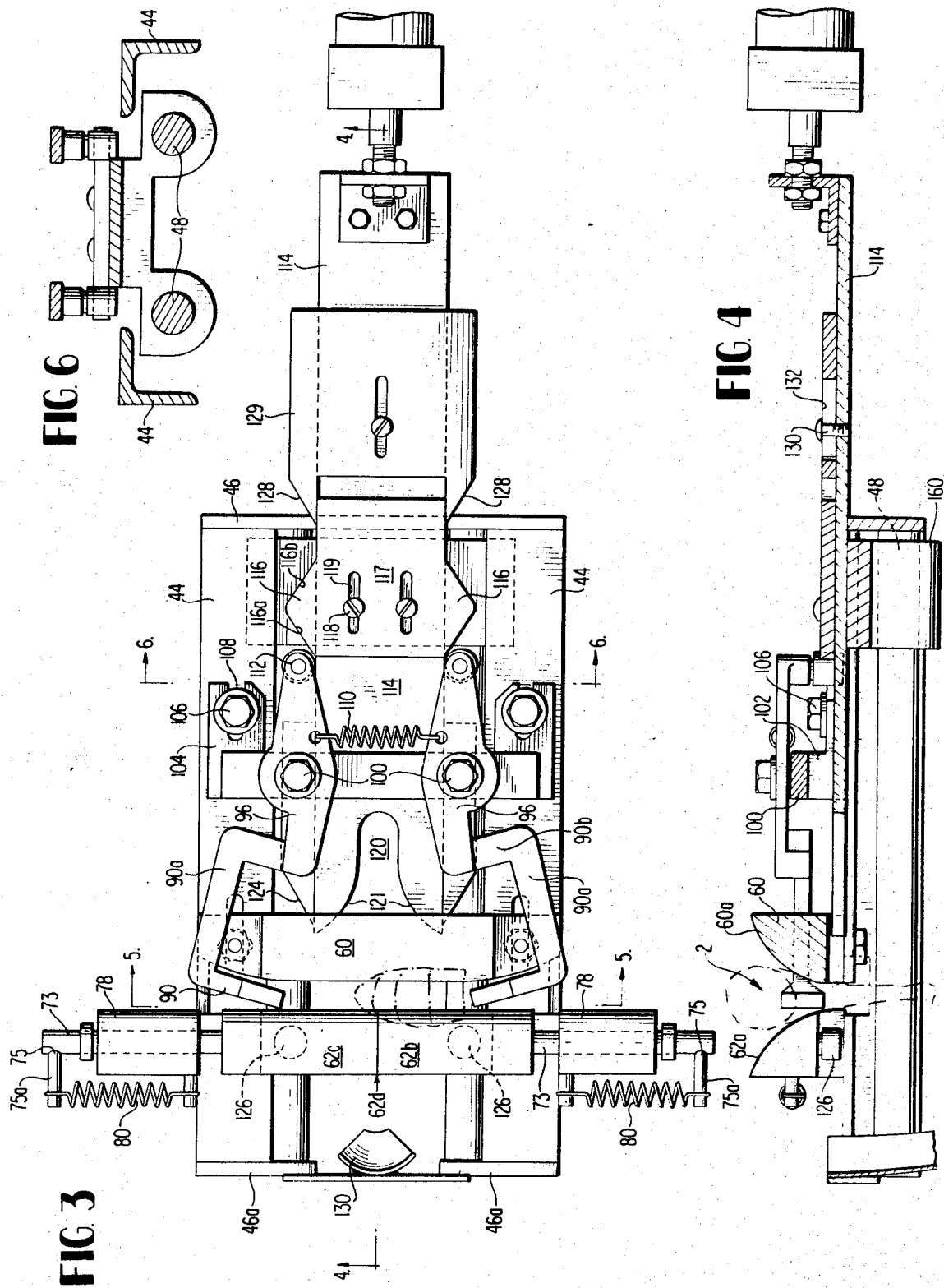

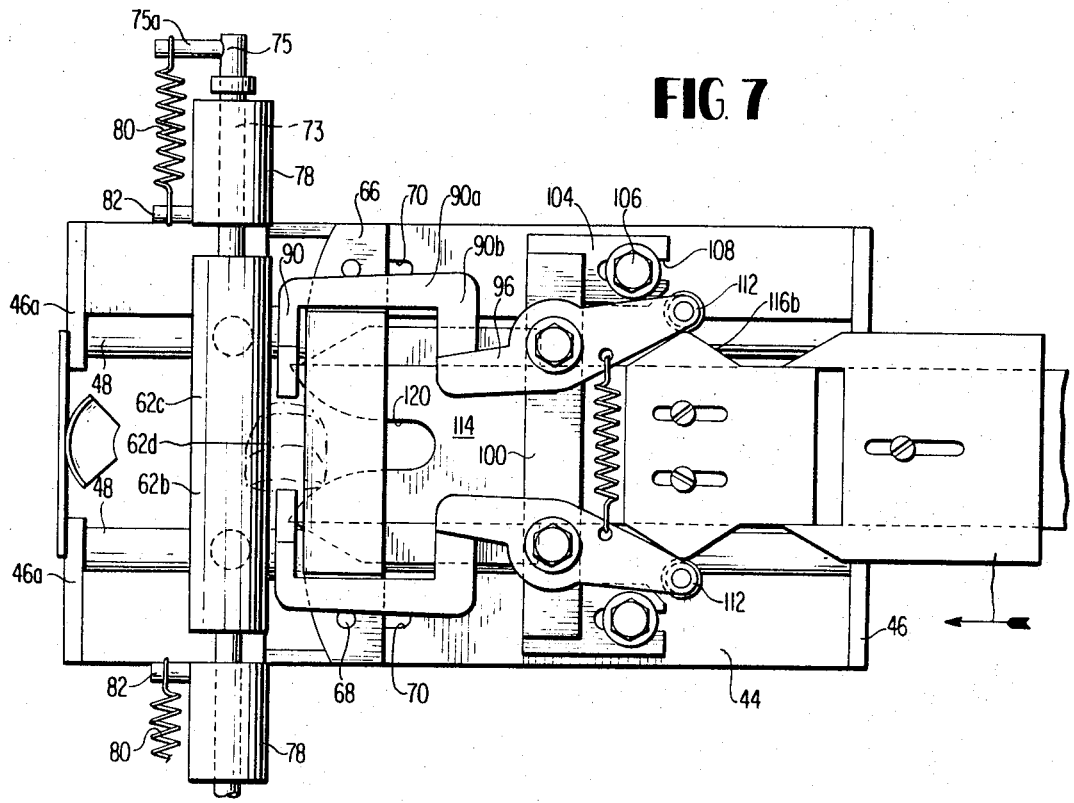

SUMMARY OF INVENTION AND OBJECTS

The present invention generally relates to method and apparatus for handling shrimp or similar food items. More specifically, the present invention relates to positioning shrimp for reception by a deshelling apparatus; however the invention may be used for placing shrimp into a predetermined position for other purposes not necessarily limited to deshelling apparatus or any particular type of deshelling apparatus.

One of the broad objects of the present invention is to provide a novel method and apparatus for placing shrimp or similar items into a predetermined position. Included herein is such a method and apparatus which will position large quantities of shrimp quickly and effectively for use in commercial deshelling operations. Further included herein is the provision of an apparatus which will position shrimp mechanically and automatically without any manual guidance.

A further object of the present invention is to provide a novel method and apparatus for placing shrimp into a predetermined position wherein the shrimp extends generally in a vertical plane with the forward portion of the shrimp located above the tail portion and with the bottom of the shrimp facing a predetermined direction such that the shrimp may be received on a deshelling conveyer in a generally horizontal position with the forward portion leading the tail portion and with the back of the shrimp located above the bottom of the shrimp.

A further object of the present invention is to provide such a method and apparatus which will place shrimp into the aforedescribed position from an initial position wherein the shrimp extends generally in a vertical plane with the forward portion located above the tail portion but facing in any random direction.

A still further object of the present invention is to provide such an apparatus that will achieve the above objects with dependability over long periods of continuous use.

A still further object of the present invention is to provide such a method and apparatus which will place shrimp into said predetermined position for use in conjunction with new or old deshelling apparatus without requiring any substantial modification of the latter.

The above and other objects are achieved in a method wherein a shrimp is deposited between two closely spaced horizontal parallel holding members which may be in the form of bars, with the shrimp lying generally in a vertical plane with the tail situated below the head or forward portion of the shrimp. One of the bars is made in two axially separable sections. After placement between the bars, the shrimp is centered with the juncture of the separable bar sections after which the latter are separated while the shrimp is pushed and turned between the bar sections. During this latter movement, the shrimp is engaged on opposite portions thereof to aid in the turning of the shrimp about its longitudinal axis so that the back of the shrimp passes first through the bar sections. After passing through the bar sections, the shrimp is in the desired position in which it may be conveyed to a deshelling apparatus for reception thereon.

Apparatus representing one embodiment of the invention for carrying out the aforedescribed method includes in addition to the two bars, a first conveyor comprised of a pair of sloping closely spaced parallel rolls which rotate in counter directions for depositing the shrimp one-by-one between the bars in a generally vertical plane. Discharge of the shrimp from the rolls to the bars is controlled in timed on-by-one sequence by a gate member mounted to oscilate at the discharge end of the rolls between a shrimp blocking position wherein it detains shrimp at the discharge end of the rolls, and a shrimp release position permitting the shrimp to be deposited between the bars.

After deposit between the bars, the shrimp is centered generally at the juncture between the separable bar sections by a pair of fingers movable between the bar sections to engage opposite portions of the shrimp to center the same as mentioned. A plunger having a recess in the forward end thereof is then moved transversely below the bar sections to receive the shrimp in its recess while the separable bar sections are separated axially such that the shrimp is pushed therethrough by the plunger while caused to turn generally about its longitudinal axis. During the latter phase, the fingers are again brought into contact with opposite portions of the shrimp to aid in the turning of the shrimp so that the back of the shrimp passes first through the bar sections. After passage through the bar sections, the shrimp is then guided in the same position to a second conveyor (similar to the first conveyer) which carries the shrimp to a deshelling apparatus in the desired position wherein the forward portion of the shrimp is located above the tail portion and faces the direction of travel for proper receipt by the deshelling apparatus.

Actuation of the various parts described above in one embodiment may be achieved by a reciprocable rod operated by any suitable motor, the rod being connected to the plunger to reciprocate the same below the bars in a horizontal plane. The fingers are pivoted about vertical axes for movement in a horizontal plane by cams formed on opposite sides of the plunger. The plunger has two pairs of cams, one for centering the shrimp and the other for turning the shrimp. The separable bar sections are actuated apart by a third pair of cams formed on the forward end of the plunger to engage lugs on the separable bar sections to separate the same as the plunger passes below the bars with the shrimp received therein. Return of the bars to closed position is achieved by a spring mechanism. Another spring mechanism is employed to move the fingers away from each other in opposition to the movement towards each other produced by the associated cams on the plunger.

Other objects and advantages will become more apparent from the following detailed description taken in conjunction with the attached drawings in which:

FIG. 1 is a elevational view of apparatus embodying the invention;

FIG. 3 is a plan view of the shrimp turning mechanism included in the apparatus and shown in an initial position wherein it has just received a shrimp;

FIG. 4 is a cross-sectional view of the shrimp turning mechanism taken generally along lines 4—4 of FIG. 3.

FIG. 5 is a cross-sectional view taken generally along lines 5—5 of FIG. 3;

FIG. 6 is a cross-sectional view taken generally along lines 6—6 of FIG. 3;

FIG. 7 is a plan view similar to FIG. 3 but showing the parts in an advanced position wherein the shrimp is centered between the bar sections;

FIG. 10 is a view similar to FIG. 9 but illustrating the apparatus in a further advanced position wherein the bar sections are separated with the shrimp positioned therebetween as desired.

DETAILED DESCRIPTION

Figure 2:
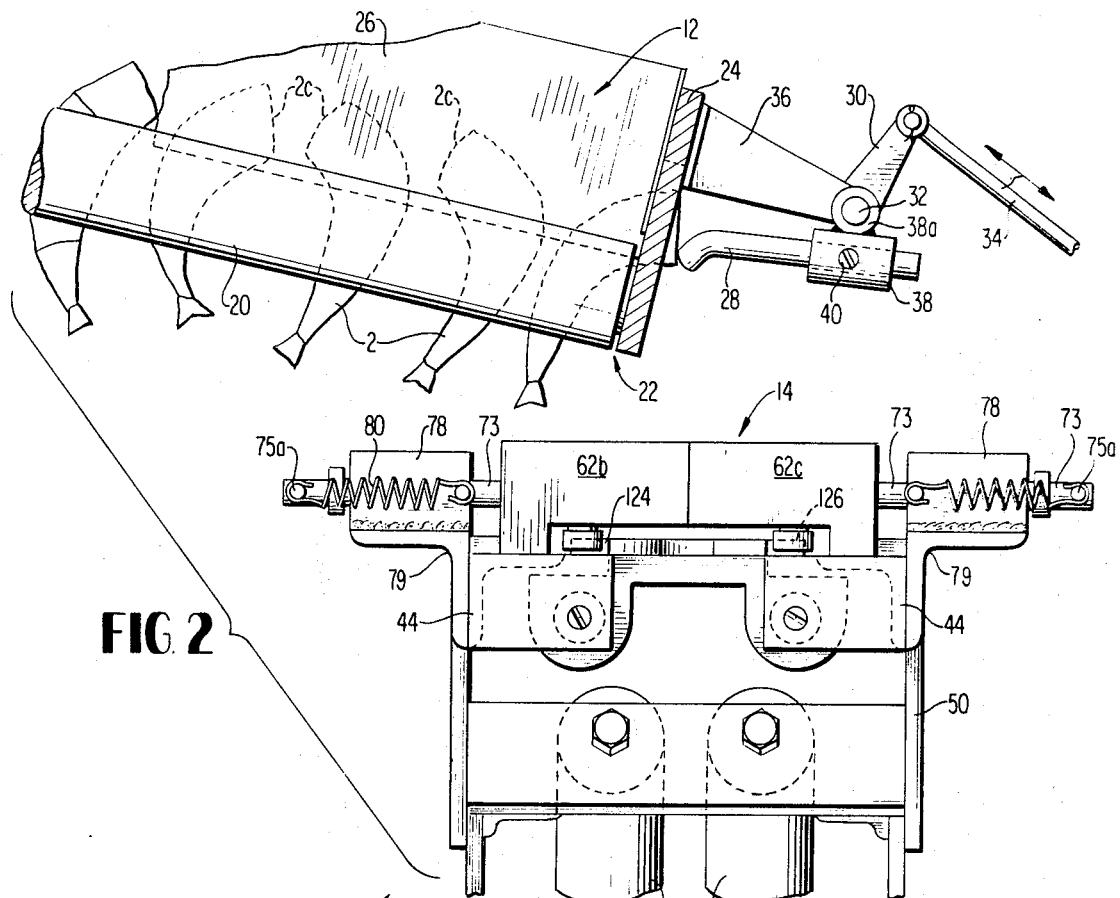
FIG. 2 illustrates the apparatus with certain parts removed as seen from the left-hand end of FIG. 1.

Referring to the drawings in detail, FIG. 1 illustrates apparatus representing one embodiment of the invention for placing shrimp 2 into a predetermined position for reception on a conveyer 10 which forms part of a deshelling apparatus (not shown) such as disclosed in U.S. Pat. No. 3,310,832. In this predetermined position, each shrimp 2 is in a generally vertical plane with its bottom 2a moving forwardly and its tail 2b situated below the forward portion 2c thereof. Although shrimp 2 are shown with their heads removed, the present invention may be applied to shrimp with heads. The predetermined position is used to deposit shrimp onto conveyer 10 with the forward portion 2c leading tail portion 2b and with the bottom portion 2a resting on conveyer 10 with the back 2d facing upwardly as shown in FIG. 1. Shrimp 2 are initially fed from a feed conveyer 12 to a positioning or turning mechanism generally designated 14 which orients them into the predetermined position after which they are conveyed in that position by a conveyer 16 to conveyer 10 of the deshelling apparatus.

Feed conveyer 12 includes a pair of closely spaced parallel rolls 20 for receiving shrimp therebetween as shown in FIG. 1. Rolls 20 slope downwardly towards discharge end 22 of the conveyer and are rotated by any suitable drive mechanism (not shown) in counter directions so as to feed shrimp 2 to turning mechanism 14. Rolls 20 may be supported in any suitable fashion above the plane of turning mechanism 14 such as by end plates 24 which in turn are mounted on opposite side rails 26 which may be supported on the floor or a base (not shown).

Shrimp 2 may be fed to conveyer 12 in any suitable fashion by hand or an endless conveyer (not shown) so that conveyer 12 receives the shrimp in between rolls 20 in a generally vertical plane with the forward portions of the shrimp facing in any random direction as illustrated in FIG. 2. When shrimp 2 reach the discharge end 22 of conveyer 12, they are deposited downwardly onto turning mechanism 14 under control of a gate which includes a stop 28 shown in the form of a rod. The latter is then oscilated into and out of blocking engagement with the shrimp 2 by means of a crank 30 fixed to one end of a shaft 32 to oscilate the latter. Crank 30 is driven by any suitable motor (not shown) through a rod 34 connected to the crank as shown. Shaft 32 is mounted in brackets 36 fixed to end wall 24, while stop 28 is secured in a sleeve 38 which in turn is fixed by sleeve 38a to shaft 32 to oscilate with the same. Stop 28 may be adjusted longitudinally toward or away from discharge end 22 of conveyer 12, by loosening screw 40 which releasably secures stop 28 in sleeve 38.

In the position shown in FIG. 2, stop 28 is in engagement with the forward portion 2c of shrimp 2 detaining its discharge until shrimp turning mechanism 14 is ready to receive it. Upon rotation of stop 28 away from the shrimp, the latter will drop into the turning mechanism 14 for positioning as will be described. It will be understood that during operation, stop 28 continuously oscillates in timed sequence correlated with the operation of the timing mechanism of 14 so that a shrimp is deposited into the latter at the proper time which will become more apparent in the subsequent description.

Shrimp turning mechanism 14 includes a frame comprised of opposite parallel side members 44 which may be steel angles. At one end thereof, side members 44 are rigidly interconnected by end member 46 while at the other end of side members 44, a pair of end members 46a are fixed thereto and extend inwardly therefrom for purposes of rigidly mounting one end of a pair of parallel guide rods 48 which extend in a horizontal plane from end members 46a to end member 46 on which they are also rigidly mounted or otherwise fixed. End members 46 and 46a may be formed from any suitable rigid material such as plate steel for example. Frame 44, 46, and 46a is supported in any suitable manner in a horizontal plane at the desired elevation such as in the shown embodiment wherein the frame is supported on opposite side frame members 49 of conveyer 16 by means of rigid legs 50 fixed to end members 44.

Supported in a horizontal plane across frame members 44, is a pair of shrimp holding members shown as bars 60, 62 which are in close parallel relationship for receiving shrimp therebetween from conveyer 12. Holding members 60, 62 are convexly curved along their mutually facing surfaces 60a and 62a as shown in FIG. 4 to facilitate receipt of shrimp therebetween. Shrimp holding member 60 hereinafter termed "stationary holding member," is fixed to frame member 44 by means of end flanges 66 which receive screws 68 that extend upwardly through slots 70 formed in side frame members 44. Slots 70 permit stationary holding member 60 to be adjusted into desired fixed position spaced relative to the other holding member 62.

Shrimp holding member 62 is comprised of two axially separable sections 62b and 62c which are mounted for slidable axial movement towards and away from each other between a closed position wherein they abut each other in axial alignment at a juncture 62d (See FIGS. 3 and 7) and an open position spaced from each other to form a gap 74 for receiving shrimp as shown in FIG. 10. Sections 62b and 62c are mounted to opposite frame side members 44 by sleeves 78 which slidably receive rods 73 while being fixed to opposite frame members 44 by angle members 79 (See FIGS. 1 and 2). Rods 73 are respectively fixed to sections 62b and 62c and project axially therefrom to terminate in end portions 75 located outwardly of sleeves 78 where they are connected to tension springs 80 serving to bias sections 62b and 62c to closed abutting positions shown in FIGS. 3 and 7. In the specific embodiment shown, the ends 75 of rod 73 have laterally extending portions 75a which axially receive one of the ends of tension springs 80. The other ends of springs 80 are anchored to lugs 82 fixed to frame side members 44 so that springs 80 extend generally parallel to mounting rods 73 of sections 62b and 62c.

When shrimp 2 are initially deposited between holding members 60 and 62, sections 62b and 62c of holding member 62 are in the closed abutting position shown in FIG. 3. In the next step of the operation, the shrimp is centered with respect to the juncture 62 of sections 62b and 62c, this centered position being shown in FIG. 7. This is accomplished by what will be termed "turning fingers" 90 which are movable inwardly and outwardly between holding members 60, 62 into and out of engagement with opposite portions of the shrimp. In the specific embodiment shown, turning fingers 90 are flared in a vertical plane at their extremities 94 for facilitating engagement with the shrimp. Moreover in the specific embodiment, fingers 90 are integral or otherwise fixed at the ends of arms 96 which are mounted for pivotal movement in horizontal planes about vertical axes passing through pivots which may be formed by bolts 97. The latter pivots 97 are mounted in an inverted U-shaped bracket 100 extending across the frame side members 44 and having opposite ends formed by vertical legs 102 which are secured to frame side members 44 by horizontal feet portions 104 projecting from vertical legs 102. The latter securement is achieved by bolts 106 passing through slots 108 in feet 104; the slots enabling adjustment of the bracket 100 and in turn the arms 96 along the frame members 44 into the desired operative position.

Fingers 90 are fixed to mounting arms 96 by L-shaped portions 90a and 90b which may be fixed to fingers 90 and arms 96 either through integral or other suitable rigid connections. It will be noted that portions 90a project at right angles from fingers 90 with the portions 90b projecting inwardly at right angles from portion 90a to in effect form a generally U-shape element. This allows the portions 90a to move inwardly towards each other without obstruction from holding member 60 which is accommodated by the U-shape recess defined by fingers 90, and portions 90a and 90b.

In one of the initial operating positions of fingers 90 such as when the shrimp is initially deposited between holding members 60 and 62, the fingers 90 are biased away from each other in an outermost position by a tension spring 110 the opposite ends of which are fastened to arms 96 by means of apertures located therein rearwardly of pivot axes 100 as shown in FIG. 3. The effect of spring 110 is to cause the rear portion of arms 96 to be pivoted towards each other about the axes 100 thereby causing fingers 90 to be pivoted away from each other since they lie on the opposite side of pivots 100 as the biasing force of spring 110. The movement of fingers 90 to their outermost position is limited by engagement of cam followers which may be lugs 112 depending from the rear end of arms 96, which lugs engage the opposite sides of a plunger generally designated 114 which is employed in the next step of the operation now to be described.

Figure 8:
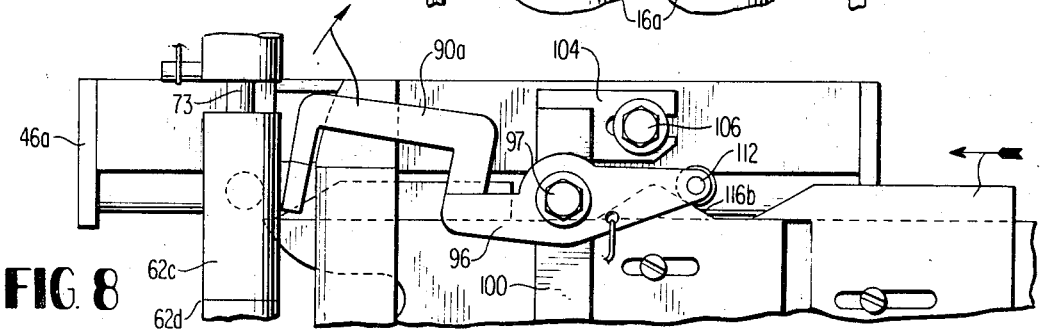
FIG. 8 is a view similar to FIG. 7 but showing the parts in a further advanced position during operation wherein the fingers are moved outwardly away from each other; and with one longitudinal section of the apparatus being removed from the illustration for purposes of brevity.

After the shrimp 2 is deposited between the holding members 60 and 62, fingers 90 are actuated inwardly towards each other to center the shrimp 2 with respect to the juncture 62d between separable sections 62b and 62c of holding member 62. Actuation of fingers 90 inwardly to center the shrimp is achieved by cams 116 which may be integrally formed or otherwise attached to the opposite sides of plunger 114 to engage cam followers 112 fixed to the rear ends of arms 96. In the specific embodiment shown, cams 116 are formed on the opposite sides of a cam plate 117 which is fixed in parallel overlying position with the top surface of plunger 114 by means of screws 118 and slots 119 as shown in FIG. 3. This specific mounting enables the cams 116 to be adjusted longitudinally of the plunger 114 into desired position prior to securement by screws 118. The latter adjustment is used so as to place the cam surfaces 116a in proper position relative to cam followers 112 so that as the plunger is moved forwardly as will be further described, transversely under shrimp holding members 60, 62 towards the shrimp at a certain point in time, cam surfaces 116a will engage cam followers 112 to cause pivoting of arms 96 about axes 100. This in turn will cause fingers 90 to pivot inwardly towards each other between shrimp holding members 60 and 62 for centering the shrimp 2 with respect to the juncture 62 of the separable sections 62b and 62c of shrimp holding members 62. As clearly shown in FIG. 3, cam surfaces 116a project outwardly from the plunger 114 at an acute angle so as to provide the desired camming action on cam followers 112. After cam followers 112 reach the outermost limit of cam surfaces 116a and as the plunger continues to move forwardly, surfaces 116b which extend inwardly at an angle from the outer extremity of surfaces 116a, (See FIG. 8) mounting arms 96 to be pivoted about their axes under the biasing force of spring 110 thereby causing the fingers 90 to return to their outermost spaced apart position similar to their initial position shown in FIG. 3.

Continued forward movement of plunger 114 is employed to receive the shrimp in a recess 120 formed in the forward end of plunger 114. As best shown in FIG. 3, recess 120 has a generally U-shape the opposite sides of which flare outwardly at 121 along curved paths so that the mouth of the recess is much wider than the bottom thereof which conforms generally to the cross-section of a shrimp. The forward end of plunger 114 containing recess 120 moves below shrimp holding member 60 and 62; it being understood that plunger 114 is mounted in a horizontal plane below shrimp holding members 60 and 62 as shown in FIG. 4. As the plunger 114 moves forwardly it will receive the shrimp in the mouth of recess 120 as shown in FIG. 7. As the plunger 114 continues to move forwardly sections 62b and 62c of shrimp holding member 62 will begin to separate axially to form gap 74 therebetween for receiving the shrimp.

Figure 9:
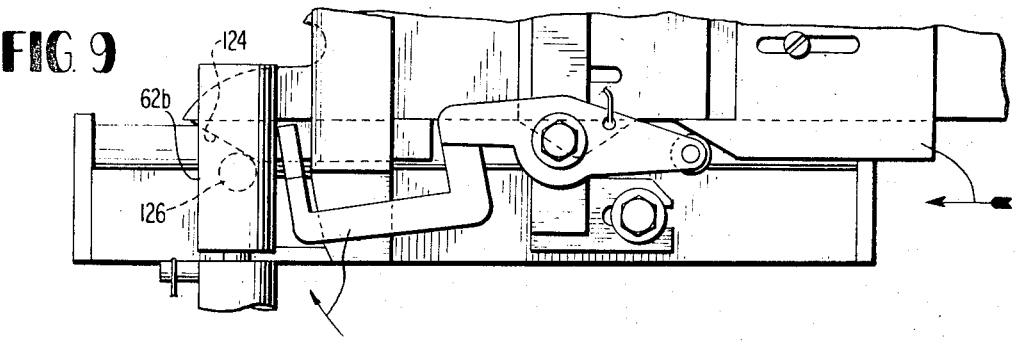
FIG. 9 is a view similar to FIG. 8 but illustrating the apparatus in a further advanced position wherein the fingers begin to move towards each other for turning the shrimp.

Actuation of sections 62b and 62c is achieved by a third pair of cams 124 formed on opposite sides of the forward portion of plunger 114 to engage cam followers 126 depending from the bottom of shrimp holding sections 62b and 62c; the interengagement between cams 124 and followers 126 being illustrated in FIG. 9. The effect of pushing the shrimp through gap 74 formed between shrimp holding sections 62b and 62c with the use of the plunger transversely receiving the shrimp in its forward recess, is to cause the shrimp to rotate counter-clockwise as viewed in FIG. 7 so that the bottom of the shrimp is received in the bottom of recess 120 and the back of the shrimp passes first through the gap 74. The latter turning of the shrimp which may be categorized as turning generally about the longitudinal axis of the shrimp, is additionally caused or at least aided by the fingers 90 which are again camed inwardly by a third pair of cam surfaces 128 located on the opposite sides of plunger 114 rearwardly of cam surfaces 116 to be engageable with cam followers 112 depending from arms 96. In the latter operation, the fingers 90 move inwardly to engage opposite portions of the shrimp to restrain it or otherwise cause it to rotate under the influence of the plunger so that the shrimp passes through gap 74 with its back first or leading. As is the case with cam surfaces 116a, cam surfaces 128 may be formed on a cam plate 129 secured on the top surface of plunger 114 by means of a screw 130 and an elongated slot 132.

As the shrimp continues to be pushed through gap 74 by plunger 114 with the shrimp in the desired predetermined position, sections 62b and 62c will remain in their open position by virtue of engagement of cam followers 126 with the opposite side edges of the forward part of plunger 114 as shown in FIG. 10. When the shrimp passes entirely through gap 74, the shrimp will fall downwardly while in the desired position to be engaged between counter-rotating rolls 16a of conveyer 116 to be conveyed in the position shown in FIG. 1 to conveyer 10 of the shrimp handling apparatus. While being so conveyed, the forward portion of the shrimp is located above the tail of the shrimp and the bottom of the shrimp faces the path of conveyer 10 so that as they reach conveyer 10 they will be engaged thereon in the desired position shown in FIG. 1. If desired, a guide chute 130 may be employed between the supply end of conveyer 16 and the area adjacent gap 74 formed between sections 62b and 62c to receive the shrimp therefrom in the desired position and to ensure that the shrimp is deposited between rollers 16b in the desired position.

After the shrimp has been positioned and passed through separable sections 62b and 62c, plunger 114 will begin to retract whereupon cam followers 126 on sections 62b and 62c will again come into engagement with cam surfaces 124 whereupon the biasing effect of springs 80 will begin to cause sections 62b and 62c to move towards each other to close gap 74. Retraction of plunger 114 will continue until the plunger is in the position such as shown in FIG. 3 whereupon the timing sequence governed by gate member 28 will permit another shrimp 2 to drop between holding members 60 and 62 to repeat the positioning operation.

Plunger 114 may be reciprocated by any suitable motor designated 150 which may be an electric, hydraulic or pneumatic motor having an output rod 152 secured in any suitable manner to the rear end of plunger 114 as shown in FIG. 1 wherein the extremity of rod 152 is threaded for receiving lock nuts 154 engaged on opposite sides of a flange 156 which in turn is secured to the rear end of plunger 114 by bolts 158. Additionally, plunger 114 may be guided in the horizontal plane by any suitable means such as in the shown embodiment wherein a pair of sleeves 160 (See FIG. 4) are secured to the underside of plunger 114 for receiving rods 48 respectively. Moreover, the various parts including the plunger 114, fingers 90 and cam plates 117, 129 may be made from any suitable material such as steel, such as by casting or otherwise from sheet steel.

To review operation with reference to the drawings, a shrimp is initially deposited between holding members 60 and 62 in the position such as shown in FIG. 3 whereupon plunger 114 is actuated forwardly to cam fingers 90 inwardly to center the shrimp such as shown in FIG. 7. As the plunger continues its forward movement the shrimp will be received in recess 120 after which cams 124 on the forward end of the plunger will begin to separate shrimp holding sections 62b and 62c and continued movement will cause shrimp to turn about its longitudinal axis under the added influence of fingers 90 which will be returned into engagement with opposite portions of the shrimp under the influence of cam surfaces 128 acting upon cam followers 112. After the shrimp is pushed entirely through gap 74 it will be deposited at the supply end of conveyer 16 where rollers 16b will carry it towards conveyer 10 in the predetermined position. The plunger 114 will then be retracted and after cam surfaces 124 leave cam followers 126, springs 80 will cause shrimp holding sections 62b and 62c to return to their closed abutting position and thereafter fingers 90 will be in their outer position shown in FIG. 3. The apparatus will then be ready to receive the next shrimp.

What is claimed is:

1. Apparatus for handling and positioning shrimp comprising in combination: two shrimp holding members in close laterally spaced relationship for receiving shrimp therebetween with the longitudinal axis of the shrimp extending transversely between said members, one of said holding members including two axially separable sections for permitting shrimp to pass transversely therethrough in a predetermined oriented position, means for axially separating said sections to form a gap therebetween to permit shrimp to move therethrough in a predetermined oriented position, pusher means for retaining the shrimp while pushing it between said separable sections to cause the shrimp to rotate generally about its longitudinal axis into said predetermined position, and means engageable with opposite portions of the shrimp for assisting in the rotation of the shrimp into the predetermined position.

2. Apparatus defined in claim 1 wherein said last recited means centers the shrimp between said holding members with respect to the gap prior to rotation of the shrimp into the predetermined position.

3. Apparatus defined in claim 1 wherein said last recited means includes a pair of shrimp turning members movable into engagement with opposite side portions of said shrimp, said pusher means having a recess receiving the shrimp and retaining it in registry with the gap between said sections as the shrimp is rotated into the predetermined position.

4. Apparatus defined in claim 3 wherein said shrimp turning members include a pair of elongated fingers movable between said holding members from the opposite ends thereof with the extremities of said fingers being engageable with opposite portions of the shrimp.

5. Apparatus defined in claim 3 wherein said pusher means includes a plunger movable transversely from one side of said other holding member to the other side of said other holding member into engagement with the shrimp, said recess being in a forward portion of said plunger.

6. Apparatus defined in claim 5 wherein said other holding member has a transverse passage therein slidably receiving said plunger.

7. Apparatus defined in claim 4 including actuating means for reciprocating said plunger, means for operatively interconnecting said plunger and said shrimp turning members for operating the latter in response to movement of said plunger and said separable sections of said one holding member to separate said sections in response to movement of said plunger.

8. Apparatus defined in claim 7 wherein said means interconnecting said plunger and said shrimp turning members, and said plunger and said separable sections include first and second cam means.

9. Apparatus defined in claim 8 wherein said fingers are mounted for pivotal movement in a plane generally parallel to the plane of said holding members, said plunger being movable under and in a plane generally parallel to the plane of said holding members.

10. Apparatus defined in claim 9 further including first spring means urging said fingers towards each other, and second spring means urging said sections of said one holding member together.

11. Apparatus defined in claim 1 further including in combination: a feed conveyor means situated below said holding members for receiving said shrimp in said predetermined position and for conveying the same away in said predetermined position to a shrimp processing apparatus.

12. Apparatus defined in claim 11 wherein there is further included a guide means for receiving said shrimp in said predetermined position thereof from said holding members and for guiding the same to said feed conveyor means while maintaining the shrimp in said predetermined position.

13. Apparatus defined in claim 11 further including a supply conveyor means for feeding shrimp between said pair of holding members in generally upright position with the tail of the shrimp depending below said holding members.

14. Apparatus for angularly moving shrimp into a predetermined position comprising means forming a gap for receiving shrimp therebetween in a predetermined position, and mechanical means for rotating shrimp into a predetermined angular position and for moving the shrimp through said gap in said predetermined angular position.

15. Apparatus defined in claim 14 wherein said mechanical means holds the shrimp in a generally vertical plane with the forward portion of the shrimp located above the tail portion of the shrimp.

16. Apparatus defined in claim 15 wherein said mechanical means rotates the shrimp with the back of the shrimp facing the gap.

17. Apparatus defined in claim 16 wherein said mechanical means includes a plunger having an open mouth recess for receiving said shrimp, and means for reciprocating the plunger towards and away from the gap.

18. Apparatus defined in claim 17 wherein said mechanical means further includes a pair of fingers movable laterally of the shrimp into engagement with opposite portions of the shrimp.

19. Apparatus defined in claim 18 wherein said fingers also are engageable with opposite portions of the shrimp to align the shrimp with the gap.

20. A method of orienting shrimp into a predetermined position with the head portion of the shrimp facing a path of travel along a shrimp processing machine; the steps comprising placing the shrimp between a pair of laterally spaced holding members with the head portion of the shrimp positioned generally above the holding members and the tail positioned generally below said holding members, one of said holding members being axially separable, rotating the shrimp about its longitudinal axis to position the back of the shrimp in registry with the juncture between separable sections of said one member, separating said sections and pushing the shrimp through said sections in the rotated position.

21. The method defined in claim 20 further including the step after passage of the shrimp through said sections of the holding members, of catching said shrimp in a receptacle conformed generally to the shape of the shrimp so as to restrict and maintain the shrimp in said predetermined position for conveyance to a shrimp processing apparatus.

22. The method defined in claim 20 further including the step of centering the shrimp between the holding members prior to rotating the shrimp.

23. The method defined in claim 21 further including the step of conveying said shrimp away from said members by counter-rotating rolls positioned to receive shrimp therebetween from the receptacle for transfer to a shrimp processing apparatus.

24. The method defined in claim 20 further including the step of feeding the shrimp to said holding members from a supply conveyor and timing the discharge of the shrimp from the supply conveyor to the holding members so that a shrimp is deposited between said members after a previous shrimp has been rotated and passed through said one holding member.

25. In combination with shrimp handling apparatus including a first conveyor for moving shrimp in a generally horizontal position with the back of the shrimp located upwardly and the bottom of the shrimp located downwardly and with the tail portion of the shrimp located rearwardly; means for feeding shrimp to said conveyor with the forward portion of the shrimp facing in general alignment with the path of travel of said first conveyor, said means including shrimp engaging means for orienting said shrimp with the head portion of the shrimp facing said path of travel.

26. The combination defined in claim 25 wherein said means includes a pair of feed rolls receiving said shrimp with the head portion located generally above the rolls and the tail portion depending generally from the bottom of the rolls and wherein said shrimp engaging means orients the shrimp in said predetermined position prior to placement onto said feed rolls.

27. Apparatus for turning shrimp generally about its longitudinal axis for orienting the shrimp in a predetermined position, the apparatus comprising in combination: two generally parallel closely spaced shrimp holding members positioned generally in a horizontal plane for receiving shrimp therebetween, one of said holding members including two axially separable sections for permitting shrimp to pass transversely therethrough in a predetermined oriented position, first means for axially separating said sections to form a gap therebetween for receiving shrimp in said predetermined oriented position, pusher means for retaining the shrimp while pushing it through said gap between said separable sections, a pair of shrimp engaging members movable into engagement with opposite portions of said shrimp when it is positioned between said holding members, second means for actuating said pusher means for moving the shrimp through said gap, and third means for actuating said shrimp engaging members for causing them to engage opposite portions of said shrimp.

28. Apparatus defined in claim 27 wherein said second means includes a motor for reciprocating said pusher means, said third means includes a first cam and follower means on said pusher means and said shrimp engaging members, and said first means includes a second cam and follower means on said pusher means and said separable sections.

29. The apparatus defined in claim 28 wherein said pusher means and said shrimp engaging members move in horizontal planes.

30. Apparatus defined in claim 29 wherein said shrimp engaging members are mounted for pivotal movement about vertical axes.

31. Apparatus defined in claim 30 wherein said first cam and follower means includes cam followers on said shrimp engaging members and cams formed on opposite sides of said pusher means for engagement with said cam followers; and wherein said second cam and follower means includes cam followers on said separable sections respectively to be engagable with forward portions of said pusher means for separating said sections.

32. The apparatus defined in claim 31 further including a first spring means for yieldingly urging said shrimp engaging members into a fully spaced apart position, and a second spring means yieldingly urging said separable sections to a closed abutting position.

33. Apparatus defined in claim 32 wherein said pusher means has a recess in the forward end thereof for receiving the shrimp while it pushes the shrimp through said gap between said separable sections.

34. Apparatus defined in claim 33 wherein shrimp engaging members are fingers movable generally between said shrimp holding members for engaging opposite portions of said shrimp.

35. In combination with shrimp handling apparatus including a first conveyer for moving shrimp in a generally horizontal position with the head portion of the shrimp facing forwardly in the direction of movement of the conveyer and the tail portion of the shrimp located rearwardly; means for feeding shrimp to said conveyer with the forward portion of the shrimp facing in general alignment with the path of travel of said first conveyer, said means including shrimp engaging means for orienting said shrimp with the head portion of the shrimp facing said path of travel.

36. The combination defined in claim 35 wherein said means includes a pair of feed rolls receiving said shrimp with the head portion of the shrimp positioned upwardly and facing toward said first conveyer and the tail portion of the shrimp positioned downwardly below the head portion, and wherein said shrimp engaging means orients the shrimp in said predetermined position prior to placement onto said feed rolls.

37. Apparatus for handling shrimp comprising, in combination, means forming a gap for receiving shrimp therebetween in a predetermined position, a plunger reciprocable across said gap and having means for receiving a shrimp for positioning the shrimp in said predetermined position and for moving said shrimp through said gap in said predetermined position, and means for reciprocating said plunger across said gap.

38. The apparatus defined in claim 37 wherein said means forming said gap includes two members movable towards and away from each other for respectively closing and forming said gap.

39. The apparatus defined in claim 38 wherein said movement of said members is synchronized with movement of said plunger such that the members are spaced apart to form said gap when the plunger is moving across said gap.

40. The apparatus defined in claim 39 further including additional means for orienting the shrimp in said predetermined position for passage through said gap.

41. The apparatus defined in claim 37 including means including said plunger for rotating the shrimp about the longitudinal axis thereof into said predetermined position for passage through said gap.

42. The apparatus defined in claim 39 further including, in combination, means for depositing shrimp to be received in said plunger in synchronism with movement of said plunger and said members.

43. A method of orienting shrimp into a predetermined position comprising the steps of forming a gap for receiving the shrimp in said predetermined position, and mechanically rotating the shrimp about an axis which extends generally in the longitudinal direction of said shrimp to place it in a predetermined position, and moving the shrimp in said predetermined position through said gap.

* * * * *